(12) United States Patent
Kumamoto

(10) Patent No.: US 9,395,939 B2
(45) Date of Patent: Jul. 19, 2016

(54) METHOD FOR MANAGING RE-ASSIGNMENT OF PRINT JOBS IN CASE OF PRINTER ERRORS

(75) Inventor: Danny Naoshi Kumamoto, Garden Grove, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 1075 days.

(21) Appl. No.: 12/568,891

(22) Filed: Sep. 29, 2009

(65) Prior Publication Data

US 2011/0075192 A1    Mar. 31, 2011

(51) Int. Cl.
*G06F 15/00* (2006.01)
*G06F 3/12* (2006.01)
*G06K 1/00* (2006.01)
*G06F 11/07* (2006.01)

(52) U.S. Cl.
CPC .............. *G06F 3/121* (2013.01); *G06F 3/1234* (2013.01); *G06F 3/1261* (2013.01); *G06F 3/1285* (2013.01); *G06F 11/0733* (2013.01); *G06F 11/0793* (2013.01)

(58) Field of Classification Search
USPC ................................................. 358/1.1–1.18
See application file for complete search history.

(56) References Cited

U.S. PATENT DOCUMENTS 7,634,551 B2 * 12/2009 Tredoux ............. H04N 1/00347
                                                         709/220
8,384,927 B2 *  2/2013 Harmon ................ G06F 3/1204
                                                         358/1.15

2002/0089687 A1    7/2002 Ferlitsch et al.
2003/0090697 A1 *  5/2003 Lester et al. ................. 358/1.14
2004/0190057 A1 *  9/2004 Takahashi et al. ........... 358/1.15
2007/0076238 A1 *  4/2007 Odagiri ........................ 358/1.14
2007/0229860 A1   10/2007 Matsubara et al.
2007/0229881 A1   10/2007 Matsubara et al.
2011/0058215 A1    3/2011 Yoshizumi et al.

FOREIGN PATENT DOCUMENTS

JP    H8-115183     5/1996
JP    H9-311767    12/1997
(Continued)

OTHER PUBLICATIONS

European Search Report in counterpart application EP 10176322.5 dated Jan. 10, 2013.
(Continued)

*Primary Examiner* — Douglas Tran
(74) *Attorney, Agent, or Firm* — Chen Yoshimura LLP

(57) ABSTRACT

A print shop management method for handling re-assignment of print jobs after a printer error occurs. After a print job is assigned to a printing device, the print shop management system monitors the status of the printers. When a printer error occurs, re-assignment decisions is made based on the severity of the error, so that less severe errors can be resolved by the operator without job re-assignment, while more severe errors cause the print job to be automatically re-assigned to another printer. For some errors, the print shop management system may notify the operator of the error, and wait for a timeout period; if the operator does not respond within the timeout period, the print job will be re-assigned to another printer. The handling of a printer error may be affected by other factors such as time of day, physical proximity of an operator, etc.

10 Claims, 2 Drawing Sheets

(56) References Cited

FOREIGN PATENT DOCUMENTS

| JP | 10-136143 | 5/1998 |
| JP | 2000-155664 | 6/2000 |
| JP | 2002-215369 A | 8/2002 |
| JP | 2003-223295 A | 8/2003 |
| JP | 2004-102797 | 4/2004 |
| JP | 2005-122275 A | 5/2005 |
| JP | 2006-53716 | 2/2006 |
| JP | 2006-155162 A | 6/2006 |
| JP | 2008-68528 | 3/2008 |
| JP | 2009-9223 A | 1/2009 |
| JP | 2011-60045 | 3/2011 |

OTHER PUBLICATIONS

Japanese Office Action, dated Nov. 25, 2014, in a counterpart Japanese patent application, No. JP 2010-204735.

Japanese Office Action, dated Apr. 1, 2014, in a counterpart Japanese patent application, No. JP 2010-204735.

* cited by examiner

METHOD FOR MANAGING RE-ASSIGNMENT OF PRINT JOBS IN CASE OF PRINTER ERRORS

BACKGROUND OF THE INVENTION

1. Field of the Invention

This invention relates to print job processing method and apparatus, and more particularly, to print job processing method and apparatus for a print shop employing multiple printers.

2. Description of Related Art

In an environment that processes a large number of print jobs with multiple printers, there has been a need to manage print jobs efficiently in an organized fashion. Examples of such an environment are professional print shops and print/copy departments at large organizations, where a variety of print requests, such as large-volume duplication and large document printing, needs to be processed and completed by utilizing multiple printers within a short turn-around time. These environments are collectively referred to as "print shops" in this application. Typically, each printing job specifies a source file that electrically contains a document to be printed, the size, color and the type of the paper on which the document should be printed, the printing resolution, duplex or single-side printing, and certain finishing conditions, such as book, staple, collate printing, etc., depending on a print job requester's needs. In order to process a large volume of print jobs that each differ in terms of these job parameters, a print shop utilizes multiple commercial grade printers. Each of these printers has limitations on available printer settings, such as the paper size, the paper type, resolution settings, etc. In addition, the print shop employs various finishing devices, such as collators, staplers, hole punchers, folding machines, binding machines, etc.

A print shop management system is typically implemented on a print shop management apparatus such as a computer connected to the printers to manage the printers and finishing devices. The print shop management system submits (i.e. assign) each print job to one or more printing devices and finishing devices to produce the print job. The job submission may be done automatically by the print shop management system, semi-automatically with certain amount of operator intervention, or manually where decisions of how to submit the print job to appropriate printers or finishing devices are made by an operator. Sometimes, multiple printers are grouped together for purposes of assigning a print job, and are referred to as clustering of printers. When a print job is assigned to a cluster, the print job is broken down into series of sub-jobs which are sent to the individual printers in the cluster. The print shop management system then waits for all the printers in the cluster to finish the sub-jobs before a job is considered completed.

In some print shop management systems, when a printer encounters an error condition and becomes non-functional before it finishes printing an assigned print job, the print shop management system automatically reassigns the unfinished print job to one or more printers which are still functional and are in a completed (idle) state.

SUMMARY

The print job reassignment methods in conventional print shop management system are rigid and often not well suited for a real world print shop environment. For example, such methods do not take into account the fact that some printer errors can be recovered quickly, such as out of toner or out of paper conditions; typically the print job should not be re-assigned by default because the print operator can resolve the error as soon as the operator is notified.

Accordingly, the present invention is directed to a method and related apparatus for reassigning print jobs that substantially obviates one or more of the problems due to limitations and disadvantages of the related art.

An object of the present invention is to provide a more flexible method for reassigning print jobs when a printer becomes non-operational.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for managing a print job implemented in a print job management apparatus for managing a plurality of printers, which includes: (a) assigning a print job to a printer; (b) determining whether an error condition has occurred with the printer before the print job is completed; (c) for at least some error conditions, automatically re-assigning the print job to another printer; and (d) for at least some other error conditions, waiting for at least a pre-defined time period without immediately re-assigning the print job to another printer.

More specifically, step (d) includes: if an error condition belonging to a first group of error conditions has occurred, waiting for an operator to correct the error condition without re-assigning the print job to the other printer; and if an error condition belonging to a third group of error conditions has occurred, waiting for the pre-defined time period, and if the error condition is not resolved within the pre-defined time period, re-assigning the print job to the other printer. Step (c) includes: if an error condition belonging to a second group of error conditions has occurred, automatically re-assigning the print job to another printer.

In another aspect, the present invention provides a computer program product comprising a computer usable medium (e.g. memory or storage device) having a computer readable program code embedded therein that causes a data processing apparatus to perform the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
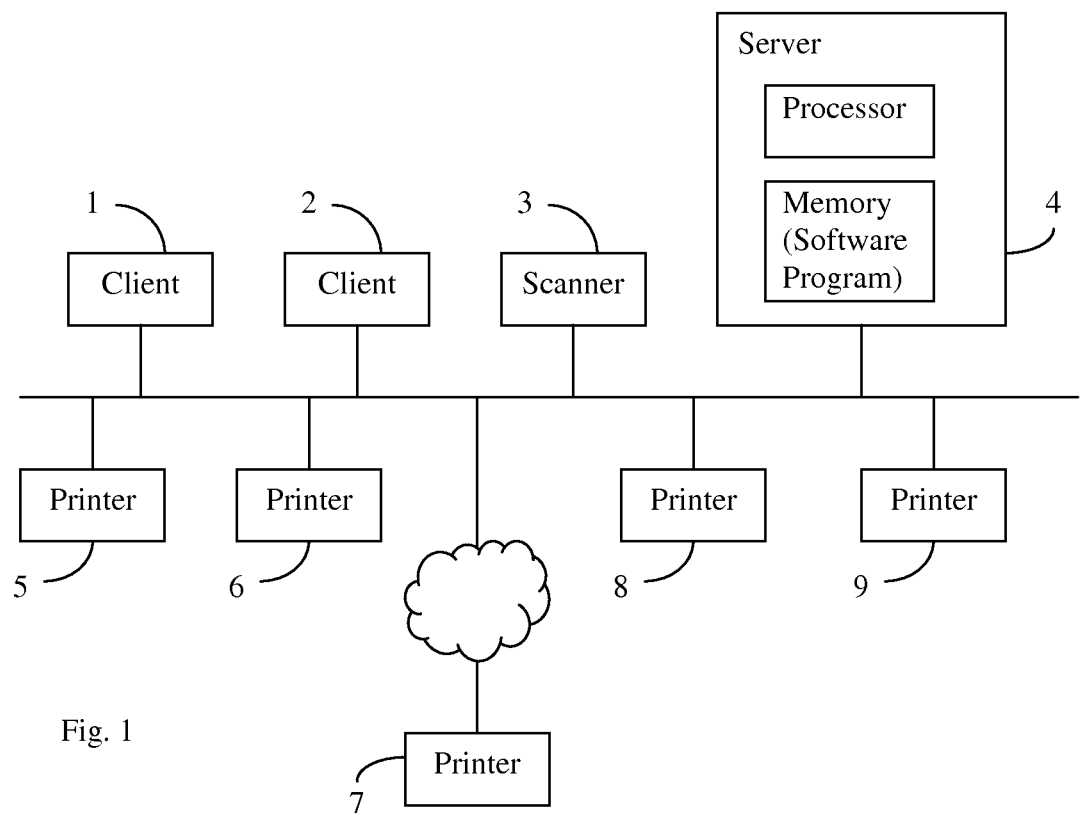
FIG. 1 schematically illustrates a print management system having multiple printers and a print job management server in which embodiments of the present invention can be implemented.

FIG. 1 illustrates an example of a print shop having multiple printers, where embodiments of the present invention may be implemented. In the print shop system, client computers 1 and 2 are connected to a server 4 via a local area network (LAN). Scanner 3 is also connected to server 4 via the LAN. In this example, B&W printers 5, 6, and 7 and color printers 8 and 9 are connected to the server through the LAN. In this example, printers 5-9 are commercial standard high-end printers that can handle high speed, high quality printing. Each of the printers 5-9 has multiple paper trays to store paper of various sizes, color, and types. Further, some of the printers 5-9 are equipped with a sophisticated output sorting mechanism with multiple output trays to perform collate printing or other print finishing functions. Each printer has one or more display monitors to display the status of the printing and various warning and instruction messages to a user. Each printer is equipped with its own central processing unit (CPU) and appropriate hardware/software to control its own printing operations, and communicates with server 4 via a LAN. Some of these printers may also be multifunction printers that can perform copying and scanning of documents. Appropriate server software is installed in server 4 to perform various standard network administrative functions.

According to embodiments of the present invention, in addition to the server administrative software, print job management software is installed on server 4 for managing a large number of print jobs that come into the print shop. The print job management software may be stored in either of a read only memory (ROM) or a hard disk drive (HDD), which can be accessed by the CPU of the server 4. Once a print shop operator calls the print job management software, server 4 reads out the print job management software from the ROM or HDD to a random access memory (RAM) of the server to carry out various functions of the software, including management of print jobs. The print job management software preferably is designed to run on Windows OS, Macintosh OS, or Unix X Windows or other computer operating systems implementing a GUI (graphic user interface), such as a touchscreen and/or a mouse and a keyboard, coupled with a display monitor. Server 4 (or any suitable data processing apparatus) running print job management software of embodiments of the present invention is hereinafter referred to as "print job management server." In this application, the terms "print job management server" and "print job management apparatus" broadly refer to any data processing apparatus that can implement various features of embodiments of the present invention described below with appropriate hardware/software.

While FIG. 1 shows a print shop environment, the invention is not limited to any physical setting of a shop or network, and can be applied to a print shop system having a distributed setting where printers at different locations are connected to a server. In particular, it should be apparent that one or more of the components of the print shop system can communicate with the rest of the system via virtual private network (VPN) or similar means through the Internet. Moreover, in FIG. 1, although the server 4 functions as the print job management server as well as the network server, a separate stand-alone computer may be provided to run the print job management software. In the alternative, when properly configured, one of the client computers 1 and 2 or the computers attached to one of the printers 5-9 (if such a printer exists among them) may be used to assume the role of the print job management server. Further, a print management system of the present invention can be implemented in a proprietary hardware system that is specifically designed to perform the above-described various functionalities of the print management system.

A print job is a print request specifying various desired options or requirements together with one or more documents to be printed. For example, a customer may bring a floppy diskette containing a file in the PDF format for printing with a particular finishing option. The print shop operator asks the customer what kind of print jobs is desired to figure out print job parameters. Alternatively, the customer may be asked to fill out a questionnaire sheet to describe what print options he/she desires. For example, the customer may desire that the document be printed on 24 lb 25% cotton letter size paper in full color in the double-sided printing mode in the amount of 100 copies. The print shop operator then records these job parameter values along with customer information as a file and stores the file and the source PDF file onto the hard disk drive or other secured storage device so that the print job parameters are associated with the file.

Theses data files representing print jobs and associated files are forwarded to server 4. This way, numerous print jobs are generated and collected by server 4 on which print job management software is running. The print job management server 4 running print job management software receives the print job files, analyzes and processes the print jobs, and submits them to a printing device for printing and (if required) finishing.

The printing devices to which the server 4 assigns print jobs include printers and clusters. A printer is an actual physical printer (which may include finishing functions such as stapling) that is connected to the server 4. A cluster is a software-defined virtual printing device designed to perform a certain class of print jobs more efficiently and accurately. It is a combination of two or more printers with specified rules or algorithm. When a print job is assigned to a cluster, the print job is split into two or more jobs by a preset or user-defined rule or algorithm, and the divided jobs are processed by the respective printers and/or finishing devices designated by the cluster. The printers within a cluster may also include online finishing devices, i.e., finishing device (sorters, staplers, etc.) that are mechanically and electrically associated with a printer.

Print jobs are organized by using database entries, called "job tickets." A job ticket specifies values of various print job parameters, and associates itself to the source file(s). In one particular example, a job ticket may include a job ticket number, ticket name as well as the values of the following groups of various other job parameters: job information settings, basic settings (number of copies, orientation of paper, collate, offset printing, original paper size, output paper size, paper type, paper source, etc.), layout settings, cover sheet, finishing settings, inter-sheet settings, tab-paper settings, image quality settings, and customer information.

Each day, a print shop receives a large number of new print jobs specifying a variety of printing requirements. The print job management server analyzes incoming print jobs and assigns them to the appropriate printing device for printing. The print job assignment may be done automatically or semi-automatically. It may also be done manually.

After a print job is assigned to a printing device, the print shop management system monitors the status of the relevant printing device. When the printing device encounters error conditions, the print shop management system may re-assign the print job to other printers as appropriate. The present invention generally relates to handling of print job re-assignment. According to embodiments of the present invention, re-assignment decisions can be made based on the severity of the error, so that less severe errors can be resolved by the operator without job re-assignment, while more severe errors cause the print job to be automatically re-assigned to other printers. For example, if the job priority was high and the error is a hardware error (which requires a technician to form a repair), one can assume that the printer error will not be resolved promptly, and the print shop management system will automatically re-assign the unfinished print job or sub job to other printers. The other printers may be printers in the same cluster as the printer with error (in the case of cluster printing), or a backup printer, or any available printer that can handle the print job.

Further, the treatment of a printer error may be affected by other factors such as time of day, the physical proximity of an operator, etc. For example, during lunch hour, non-business hours, or certain other pre-specified time of the day, some printer errors will cause an automatic re-assignment, while the same error will not cause an automatic re-assignment during regular business hours. In another example, when the operator is not present in the print shop or not in the proximity of the printer in error, some printer errors will cause an automatic re-assignment, while the same error will not cause an automatic re-assignment when the operator is in the print shop or in the proximity of the printer in error. Examples of such errors are out of toner or out of paper errors. If the operator is nearby and available, then it can be handled in a straightforward manner. If the operator is out of the area or not available (e.g., due to lunch break) then such error may not get handled for some time.

The print shop management system may track the presence of specific operators or their locations within the print shop using various technologies, including a punch in/out system, RFID tags, personal mobile devices such as cell phones, WiFi enabled music player, etc.

In some situations, the print shop management system may notify the operator of the printer error, and then wait for a pre-specified timeout period (e.g., a few minutes). If the operator does not respond to the error notification within the timeout period, the print job will be re-assigned to another printer. This may be applicable to errors that can be easily resolved by an operator, such out of paper, out of toner, etc.

Figure 2:
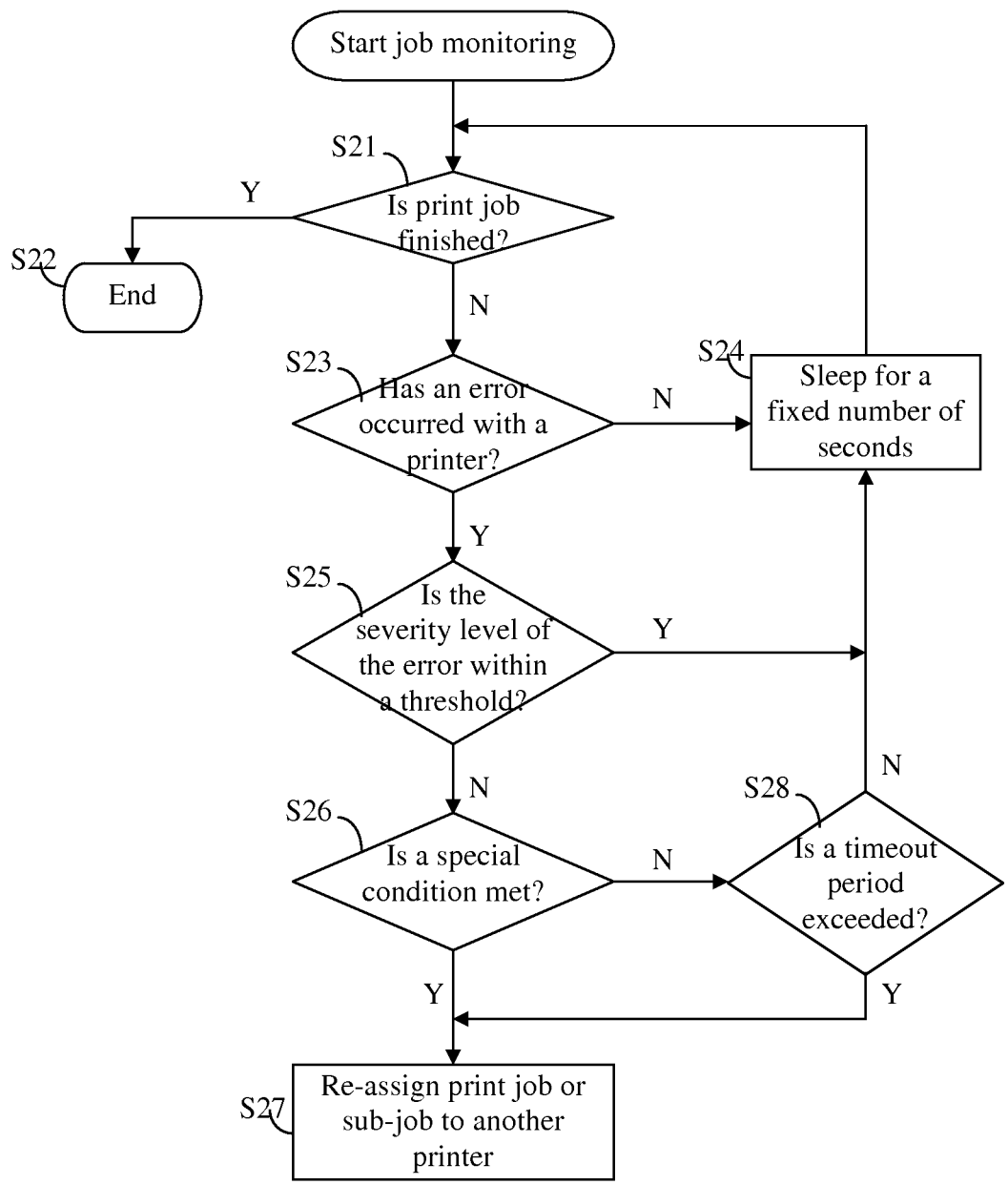
FIG. 2 illustrates a process implemented in the print shop management system for handling re-assignment of print jobs according to an embodiment of the present invention.

FIG. 2 illustrates a method executed by the print shop management system for monitoring the status of the printing device and re-assigns print jobs based on various factors. As shown in FIG. 2, the print shop management system determines whether the print job is finished (step S21). If yes ("Y" in step S21), the current monitoring process is concluded (step S22). If not ("N" in step S21), the print shop management system determines whether a printer to which the print job is assigned encountered an error (step S23). If the print job is assigned to a cluster, then all printers in the cluster are monitored for error. For convenience, in this disclosure, the term "print job" should be understood to include sub-jobs unless the context indicates otherwise.

If no printer error occurred ("N" in step S23), the print shop management system sleeps for a pre-determined time period (step S24), and then re-executes step S21. If a printer error has occurred ("Y" in step S23), the print shop management system determines whether the severity level of the error is within (i.e. lower than) a certain pre-defined severity threshold (step S25). Each error has been previously assigned a severity level by a system administrator or operator. Less sever errors, such as waste toner near full error, toner near empty error, etc., may be assigned lower severity levels, and more sever errors, such as service call error, door open error, etc., may be assigned higher severity levels. In addition, the severity level of an error may be determined by a combination of multiple factors. For example, a hardware error may be deemed to have a high severity level when the print job is set with a high priority, but only a medium severity level when the print job is set with a low priority. The severity levels and the severity threshold may be numerical values. Alternatively, the severity levels may be non-numerical values such as "low, medium, high" etc. In the latter case, the severity threshold may be any suitable expression that can differentiate less severe errors from more severe errors.

If the severity level is within the severity threshold ("Y" in step S25), the print shop management system sleeps for a pre-determined time period (step S24), and then re-executes step S21. In other words, certain less sever errors that do not exceed the severity threshold never causes the print job to be re-assigned. The print shop management system preferably issues a notification to the operator regarding the detected error condition.

If the severity level of the error is not within the severity threshold ("N" in step S25), the print shop management system further determines whether any special condition is met for this printer error (step S26). For example, the special condition may relate to time of the day (e.g., lunch time), or proximity of the operator (e.g. the operator is not present in the print shop), etc. A special condition is met if the condition is applicable to the printer error and the condition is met. A special condition is not met if it is not applicable to the particular printer error (e.g., the time of day condition is not applicable to device error), or if it is applicable to the particular printer error but the condition is not met (e.g., a "lunch time" condition is applicable to a paper jam error, but the present time is not lunch time).

If a special condition is met ("Y" in step S26), the print shop management system re-assigns the print job to another printer (step S27). The other printer may be another printer in the printer cluster to which the print job was originally assigned, or a backup printer, or any other available printer. The print shop management system may make the re-assignment using an analysis algorithm similar to that used in the original print job assignment, i.e., by matching the print job requirements to the printers' capabilities.

In step S26, if no special conditions are met, the print shop management system determines whether a timeout period has been exceeded for this error (step S28). If a timeout period has not been exceeded ("N" in step S28), the print shop management system sleeps for a pre-determined time period (step S24), and then re-executes step S21. If the timeout period has been exceeded and the error still exists ("Y" in step S28), the print shop management system re-assigns the print job to another printer (step S27). A timer may be used to implement step S28. When the printer error is first encountered, the print shop management system issues a notification to the operator and resets the timer. Then each time the print shop management system executes step S28, it evaluates the timer.

More generally, within the framework of FIG. 2, the various printer error conditions may be considered to fall into three groups. The first group of error conditions, typically less sever errors, will never cause an automatic re-assignment. Examples of the first group of errors may include, for example, toner near empty, paper near empty, waster toner near full, maintenance required, etc. Thus, the evaluation in step S25 can be alternatively expressed as, "Does the error condition belong to the first group?" The second group of error conditions, typically the most severe errors, will always cause a re-assignment. Examples of the second group of errors may include, for example, parts missing error, service call error, device error, etc. Thus, the evaluation in step S26 can be alternatively expressed as, "Does the error condition belong to the second group?" For the third group of error conditions, i.e. error conditions that do not belong to the first or the second group, the print shop management system will re-assign a job only if an operator has not responded to the error notification within a timeout period. Examples of the third group of errors may include, for example, out of toner, out of paper, paper jam, cover open, etc. Of course, in addition to the embodiment described here, other suitable decision logic can be implemented to determine whether and when to re-assign a print job.

As described earlier, along with the nature of the printer error, special conditions such as time of day, operator proximity, etc. may be a part of the definition of an error condition. For example, "paper jam when no operator is in the vicinity of the printer" and "paper jam when an operator is in the vicinity of the printer" may be defined as two different error conditions which may belong to different groups of error conditions.

The error handling policies, i.e. how the various error conditions are defined and how each error condition is treated, may be set by the system administrator and/or an operator. In a preferred embodiment, a default error handling policy is set by the print shop management system, and the operator can modify the default error handling policies for individual print jobs or for all jobs managed by that operator. The default settings may be applied at the operator level (i.e. applies to all print jobs submitted by a particular operator), at the server level (i.e. applies to all print jobs managed by a particular server), or at the shop level (i.e. applies to all print jobs in the print shop).

The print job re-assignment method described above fine-tunes the re-assignment of a print job in case of printer error. It provides a more flexible and efficient method for handling error recovery. The method is applicable to cluster printing and non-cluster printing.

It will be apparent to those skilled in the art that various modification and variations can be made in the print job re-assignment method and related apparatus of the present invention without departing from the spirit or scope of the invention. Thus, it is intended that the present invention cover modifications and variations that come within the scope of the appended claims and their equivalents.

What is claimed is:

1. A method for managing a print job implemented in a print job management apparatus for managing a plurality of printers, the method comprising:
   (a) assigning a print job to a printer cluster which contains a plurality of printers, wherein the print job is divided into two or more sub-jobs and the divided sub-jobs are assigned to two or more of the plurality of printers of the cluster for processing;
   (b) continuing to monitor printer statuses of the printers in the printer cluster after printing begins, and determining whether an error condition has occurred with any one of the printers in the printer cluster before the print job is completed;
   (c) if an error condition belonging to a second group of error conditions has occurred for a printer in the printer cluster, automatically and immediately re-assigning the sub-job processed by that printer to another one of the printers in the printer cluster; and
   (d) if an error condition belonging to a third group of error conditions that is less severe than the second group of error conditions has occurred for a printer in the printer cluster, waiting for a pre-defined time period without immediately re-assigning the sub-job processed by that printer to another one of the printers in the printer cluster, and then re-assigning the sub-job to another one of the printers in the printer cluster if the error condition is not resolved within the pre-defined time period.

2. The method of claim 1, further comprising:
   (e) if an error conditions belonging to a first group of error conditions that is less severe than the third group of error conditions has occurred for a printer in the printer cluster, waiting for an operator to correct the error condition without re-assigning the sub-job processed by that printer to the other one of the printers in the printer cluster.

3. The method of claim 2, wherein the first group of error conditions includes toner near empty, paper near empty, waster toner near full, and maintenance required, wherein the second group of error conditions include parts missing error, service call error, and device error, and wherein the third group of error conditions include out of toner, out of paper, paper jam, and cover open.

4. The method of claim 1, wherein at least some of the error conditions are partially defined by a special condition including a time of day or proximity of an operator.

5. The method of claim 1, wherein step (b) includes repeatedly detecting whether an error condition has occurred with the printer.

6. A computer program product comprising a non-transitory computer usable medium having a computer readable program code embedded therein for controlling a data processing apparatus, the data processing apparatus being connected to a plurality of printers, the computer readable program code configured to cause the data processing apparatus to execute a process for managing a print job comprising:
   (a) assigning a print job to a printer cluster which contains a plurality of printers, wherein the print job is divided into two or more sub-jobs and the divided sub-jobs are assigned to two or more of the plurality of printers of the cluster for processing;
   (b) continuing to monitor printer statuses of the printers in the printer cluster after printing begins, and determining whether an error condition has occurred with any one of the printers in the printer cluster before the print job is completed;
   (c) if an error condition belonging to a second group of error conditions has occurred for a printer in the printer cluster, automatically and immediately re-assigning the sub-job processed by that printer to another one of the printers in the printer cluster; and
   (d) if an error condition belonging to a third group of error conditions that is less severe than the second group of error conditions has occurred for a printer in the printer cluster, waiting for a pre-defined time period without immediately re-assigning the sub-job processed by that printer to another one of the printers in the printer cluster, and then re-assigning the sub-job to another one of the printers in the printer cluster if the error condition is not resolved within the pre-defined time period.

7. The computer program product of claim 6, further comprising:
   (e) if an error conditions belonging to a first group of error conditions that is less severe than the third group of error conditions has occurred for a printer in the printer cluster, waiting for an operator to correct the error condition without re-assigning the sub-job processed by that printer to the other one of the printers in the printer cluster.

8. The computer program product of claim 7, wherein the first group of error conditions includes toner near empty, paper near empty, waster toner near full, and maintenance required, wherein the second group of error conditions include parts missing error, service call error, and device error, and wherein the third group of error conditions include out of toner, out of paper, paper jam, and cover open.

9. The computer program product of claim 6, wherein at least some of the error conditions are partially defined by a special condition including a time of day or proximity of an operator.

10. The computer program product of claim 6, wherein step (b) includes repeatedly detecting whether an error condition has occurred with the printer.

\* \* \* \* \*